Jan. 6, 1925.

M. S. NESBITT 1,521,787

MACHINE FOR SEPARATING AND GRADING SEEDS AND GRAINS

Filed Feb. 14, 1921  2 Sheets-Sheet 1

Inventor
M. S. Nesbitt
By R. M. McCracken,
his Attorney

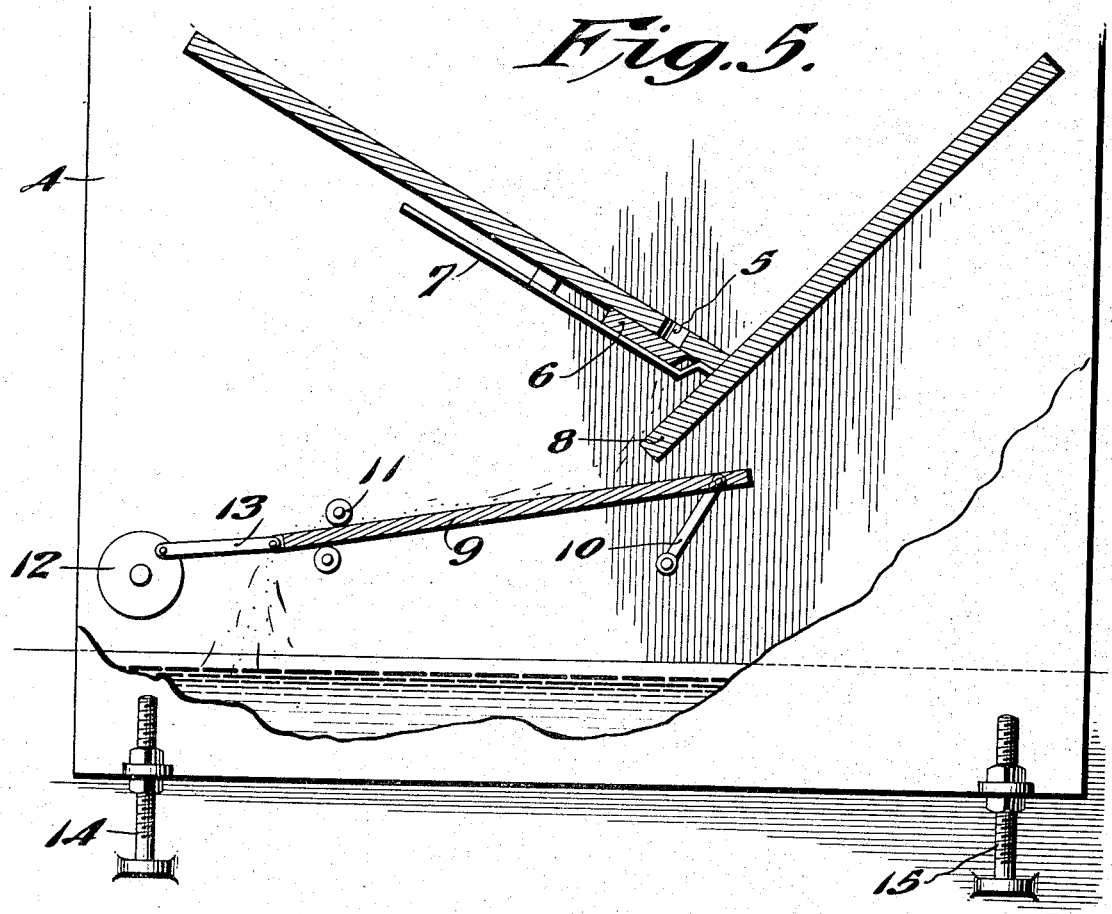
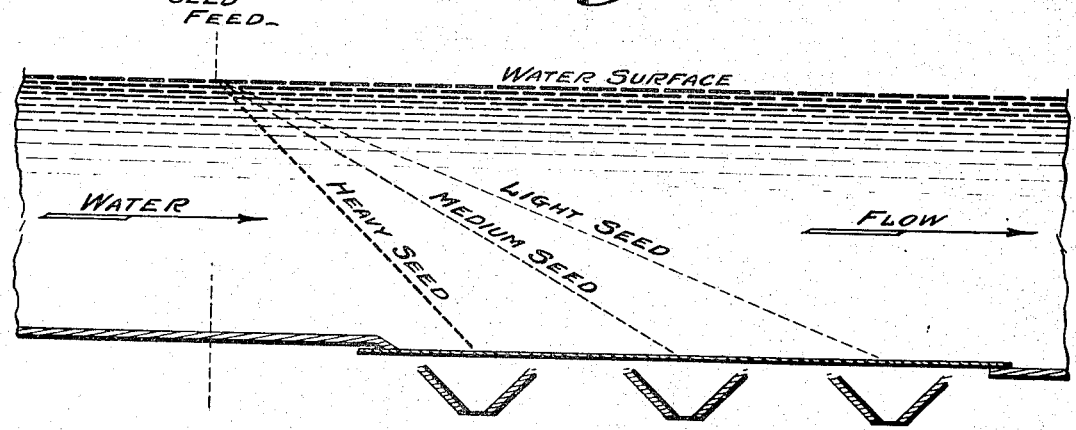

Patented Jan. 6, 1925.

1,521,787

UNITED STATES PATENT OFFICE.

MILTON S. NESBITT, OF PAYETTE, IDAHO.

MACHINE FOR SEPARATING AND GRADING SEEDS AND GRAINS.

Application filed February 14, 1921. Serial No. 444,867.

*To all whom it may concern:*

Be it known that I, MILTON S. NESBITT, resident of Payette, Payette County, State of Idaho, citizen of the United States, have invented certain new and useful Improvements in a Machine for Separating and Grading Seeds and Grains, of which the following is a specification.

This invention relates to a machine for and method of separating and grading seeds and grains, and particularly to a machine and method by which seeds and grains of different density are separated and graded by specific gravity.

Bodies of different density sink through water at different rates of speed, and as noxious weed seeds have a different specific gravity from clover and alfalfa seeds, these seeds and the different grain seeds also possessing different specific gravity, it is an object of my invention to provide a machine with which seeds and grain having weed seeds or other noxious matter mixed therewith are precipitated into a flowing stream of water and separation is accomplished by settling, the seeds of different specific gravity being collected at different points.

A further object resides in so constructing the machine that the different classes of seeds are removed from the body of water and are collected at different points where the noxious matter may be discarded and the good seed or grain can be collected and dried or otherwise treated.

Another object lies in providing independent means by which the rate of flow of the water and the rate of feed of the seeds can be regulated, thus adapting the machine for treatment of various kinds and characters of seeds and grains.

Still another object resides in providing a riddle or other means for removing scum and floating material from the surface of the water, thus adapting the machine for use where a continuous water supply is not available and the treating water must be pumped or conveyed back through the separating tank.

Yet another object is to provide a process for treating seeds and grains by dropping the same into a moving stream of water, seeds and grains of different specific gravity being carried for a greater or lesser distance before settling to the bottom of the stream, and collecting the seeds where deposited upon the bottom.

With these and other objects in view which will be apparent from the specification, drawings and claims, this invention includes certain novel features of construction and combination of parts which will now be set forth.

In the drawings:—

Fig. 5 is a sectional view through the feed hopper and distributing board.

Fig. 6 is a diagrammatic view illustrating the method of accomplishing the separation and grading of the seeds and grains in accordance with my invention.

Figure 1:
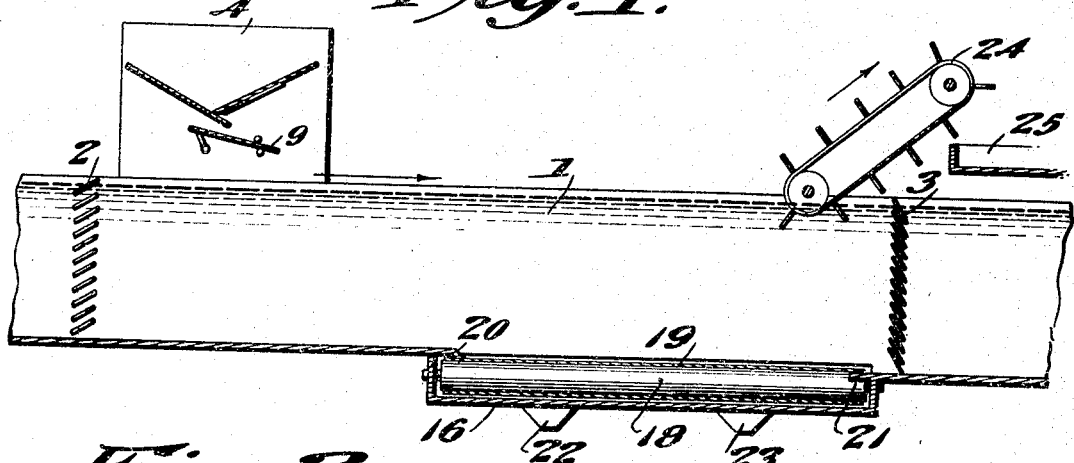
Figure 1 is a longitudinal sectional view through a machine constructed in accordance with my invention.

The body 1 of the machine is made in the form of an open topped straight-sided trough and has water flow controlling shutters at 2 and 3, the space between these shutters being the grading or separating chamber. Water is supplied at the head end of the trough to flow through shutters 2, the rate or flow being controlled at the head end of these shutters and at the foot of the chamber by shutters 3. The water may be taken from a continuous supply or can be pumped or otherwise carried from the foot end of the chamber back to the head end to flow again through the chamber.

A seed or grain hopper 4 is mounted over the head end of the chamber adjacent shutter 2 and this hopper has grain feed openings 5 therefrom, a valve board 6 being moved by a handle 7 to open and close and vary the size of the discharge openings. A portion of the hopper is extended as at 8 so that the seed or grain passing through openings 5 will strike this extension and will be spread.

A distributing board 9 is positioned beneath the extension 8 and is movably supported by a rocking arm 10 at its upper end and rolls 11 at its lower end. A disk and wrist pin 12 revolubly mounted at one side of the supporting structure are connected with the distributing board by a pitman 13, a shaking movement being thus imparted to the distributing board to accomplish a broadcast distribution of the seed or grain falling onto the distributing board from the hopper.

As indicated in Fig. 1 the hopper structure is mounted so that the discharge from the distributing board will be adjacent the surface of the water flowing through trough 1, and it is desirable that adjusting bolts 14 and 15, or other suitable adjusting means, be provided to vary the height at which the distributing board is disposed above the water surface to adapt the machine for all kinds and conditions of seed and grain.

The bottom of tank 1 is the bed of the flowing stream of water, and as the seed or grain is dropped into the flowing stream it will sink by gravity, seeds of different density and different specific gravity requiring a shorter or longer time to fall to the bed. In consequence the different grades of seeds or grain will be separated and will deposit at different points along the bottom of the trough.

With the above in view I cut out the floor of the trough for quite a distance in from the foot end of the chamber and provide a housing 16 beneath the open space. Rollers 17 and 18 are journaled within the housing at the side of the trough and a conveyor belt 19 is carried on these rolls, the floor of the trough being extended over the belt as at 20 at the upper end and the belt being lapped over the floor as at 21, at the lower end. The belt travels in the direction indicated by the arrows and at the discharge side clearance is provided so that seeds depositing on the belt are removed into the housing. The conveyor belt is preferably of canvas or other material sufficiently rough to hold and carry the seed in the depressions, and it will not therefore be necessary to provide great clearance for the seed at the discharge side. The accumulation of seeds at the edge of the opening will be sufficient to form a seal against the escape of water, as the seed discharged from the machine will be carried in the roughened depressions of the conveyor belt and the clearance in the opening need be only very slightly above the upper surface of the belt. At that side of the housing into which the seeds are discharged outlet spouts 22 and 23 are provided at points spaced along the length of the housing. A greater number of these outlet spouts can be provided and they will be spaced to take the seeds and grains deposited upon different areas of the belt. In this way the heavier seeds, first to settle, will be taken off nearest the feed end while the lighter material will be taken off adjacent the foot end of the chamber, and where intermediate grades are to be collected other discharge troughs may be employed. Ordinary slides or any form of valves may be provided to control the discharge from these discharge troughs, and if desired a floor or idler rolls may be placed beneath the conveying stretch of the belt to support the weight thereof and the weight of the water thereon.

In the treatment of some characters of seeds and grain it may be found desirable to use a skim of oil on the surface of the water to coat the seeds or to catch and float lighter particles, and further, in the continuous use of the machine it will be found that scum will collect on the surface of the water at the foot end of the chamber; and, it is therefore desirable that the screening conveyor 24 be provided at the foot end of the chamber, this conveyor being of wire mesh or other construction and being adapted to take scum and foreign matter from the water and deposit the same into trough or box 25 where it is removed.

Figure 2:
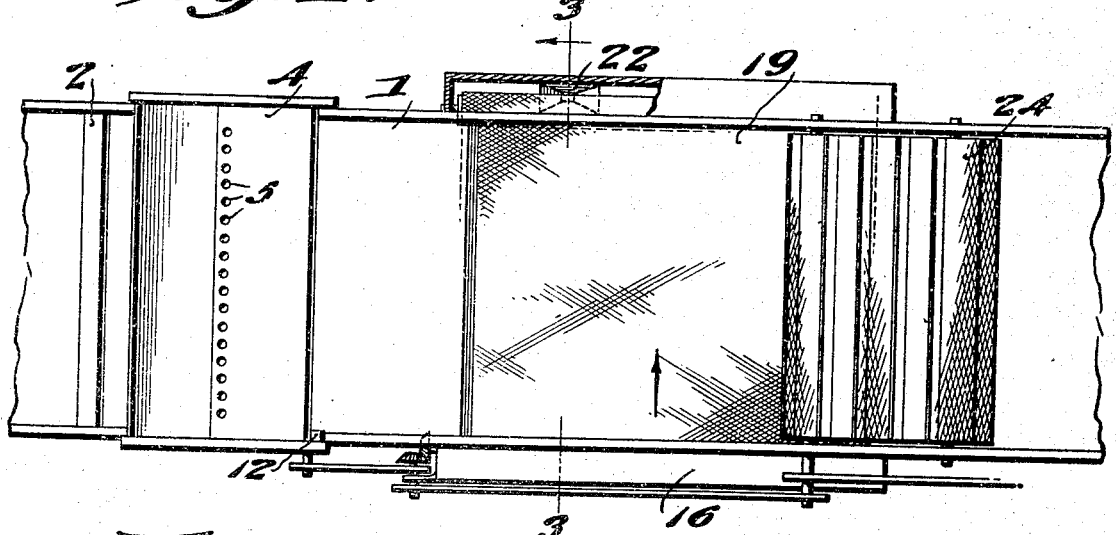
Fig. 2 is a top plan view.
Figure 4:
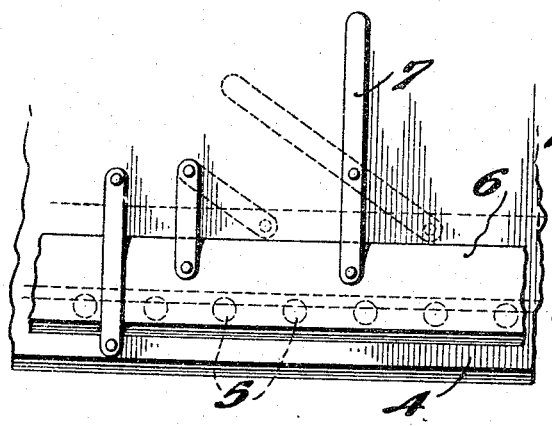
Fig. 4 is a detail of the discharge control for the feed hopper.
Figure 3:
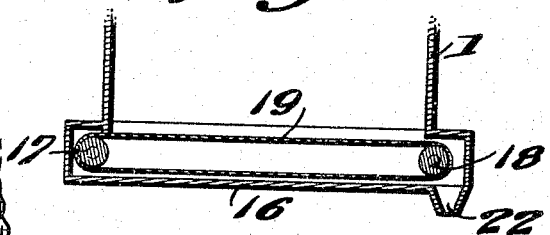
Fig. 3 is a transverse vertical sectional view on line 3—3 of Fig. 2.

A combined chain and sprocket and geared drive may be arranged as shown in Fig. 2 by which the various parts are connected to be simultaneously operated, or the different moving parts can be independently actuated.

As the operation of the mechanism has been rather fully set forth in connection with the description of the parts it is not believed that recapitulation need here be indulged in.

In carrying out the method of my invention the separation and grading of the seeds and grain are accomplished substantially as diagrammatically indicated in Fig. 6. The seed is fed or dropped upon the surface of the flowing body of water and through differences in density and specific gravity the heavy seeds first precipitate, the medium seeds settling to the bottom at a point further along the flow of the body, and the light seeds being last to settle. The various grades of seeds thus separated are removed and collected after which the good seeds may be dried or otherwise treated. Other forms of mechanism might be employed in carrying out the steps of my method.

While in the foregoing I have shown and described a certain mechanism and have set forth certain steps by which my method is accomplished, it will be appreciated that changes in the machine and variations in the steps of the method might be made within the scope of my invention, in view of which I wish to be limited only to such points as are set forth in the claims.

I claim:

1. A machine for separating and grading seeds and grain including with a separating chamber adapted to have a stream of water flowed therethrough, means to drop the seeds and grain into the water at the head end of the chamber, a transversely travelling conveying belt forming a portion of the bottom of the chamber adjacent the foot end thereof, and a screen conveyor at the foot end of the chamber to remove floating matter from the water.

2. A machine for separating seeds including with a trough constructed as a separating chamber and adapted to have water flow therethrough, a hopper at the head end of the trough from which seeds are dropped into the water to settle by gravity therein, the lighter seeds being deposited adjacent the foot end of the chamber and heavier seeds settling nearer the head end, said trough having its bottom cut out adjacent the foot end of the chamber throughout that portion where the seeds will settle, a housing constructed beneath the opening of the trough, a conveying belt mounted on rollers within said housing to have its upper stretch fill the opening in the bottom of the trough and travel transversely thereacross to convey the deposited seeds from the trough, and discharge chutes opening from the housing in which different grades of seeds are caught from said belt.

3. A machine for separating seeds including with a trough forming a separating chamber and adapted to have water flow therethrough, means at the upper and lower ends of said chamber to regulate the flow of water, a seed feed hopper mounted on the trough at the head end of the chamber, means to control the discharge of seeds from said hopper, means to distribute the seeds dropping from the hopper evenly upon the water to settle by gravity therein, the lighter seed being deposited adjacent the foot end of the chamber and heavier seeds settling nearer the head end, means to regulate the height of the seed distributing means above the surface of the water, said trough having its bottom cut out adjacent the foot end of the chamber throughout that portion where the seeds will settle, a housing constructed beneath the opening of the trough, a conveying belt mounted on rollers within said housing to have its upper stretch fill the opening in the bottom of the trough and travel transversely thereacross to convey the deposited seeds from the trough, discharge chutes opening from the housing in which different grades of seeds are caught from said belt, and means to remove floating matter from the water at the lower end of the separating chamber.

In testimony whereof I hereunto affix my signature.

MILTON S. NESBITT.